United States Patent [19]
Eberle

[11] 3,808,055
[45] Apr. 30, 1974

[54] BATTERY, COMPONENTS AND METHODS OF MAKING AND ACTIVATING

[75] Inventor: William J. Eberle, Reading, Pa.

[73] Assignee: General Battery Corporation, Reading, Pa.

[22] Filed: Aug. 21, 1972

[21] Appl. No.: 282,615

[52] U.S. Cl. .............................. 136/114, 136/134 R
[51] Int. Cl. ........................................ H01m 35/32
[58] Field of Search......... 136/134 R, 135 R, 135 S, 136/133, 166, 170, 176, 112–114

[56] References Cited
UNITED STATES PATENTS

| | | |
|---|---|---|
| 3,261,719 | 7/1966 | Shannon ........................ 136/134 R |
| 1,425,924 | 8/1922 | Willard .......................... 136/134 R |
| 1,980,903 | 11/1934 | Blake ............................. 136/134 R |
| 3,194,687 | 7/1965 | Shannon ........................ 136/134 R |
| 3,386,860 | 6/1968 | Maier............................. 136/134 R |

Primary Examiner—Anthony Skapars
Attorney, Agent, or Firm—Paul & Paul

[57] ABSTRACT

A battery is provided, generally of the lead acid storage type, having spaced plates therein, with selected plates (generally alternate ones) connected together in electrically conductive fashion, and with the battery generally having partitions separating adjacent cells, and with plates in adjacent cells also being electrically connected, with such connections between plates in the same cell and plates in adjacent cells being disposed and located in particularly novel locations for facilitating low electrical resistance in connections between connected plates, by facilitating a shortening of electrical paths, and also for providing increased headspace above the plates in the cells.

11 Claims, 16 Drawing Figures

BATTERY, COMPONENTS AND METHODS OF MAKING AND ACTIVATING

BACKGROUND OF THE INVENTION

In prior art types of batteries, and particular with regard to lead acid storage batteries adapted for automobile and like usage, batteries have been made generally to have multiple cells, such as four cells or six cells. Each of these cells contain a plurality of spaced plates (with adjacent places generally being separated one from another by non-conductive separators), and with alternate plates being connected along sides of the batteries, inside the cells.

This has conventionally been done by connecting upstanding lugs of the first, third, fifth, etc. plates by lead straps, effected by weldments, along one side of the battery cell above the plates, and with the second, fourth, sixth plates, etc. similarly connected above the plates along an opposite side of the battery. When it is desired to connect such straps from one cell to another, the generally plastic partition separating adjacent cells has posed a problem.

One standard way to overcome this problem, inasmuch as the partition generally extends to a vertical level above that of the plates themselves in order to accommodate the receipt of electrolyte within the cells, and to prevent the passage of electrolyte from one cell to another, across a partition, has been to provide post halves extending upwardly from straps that are desired to be connected, such post halves extending above the upper ends of the partitions that separate these cells, and being welded together across the upper ends of the partitions. This procedure generally requires a substantial amount of manual welding, and results in long paths of electrical connections between plates, particularly between plates of adjacent cells. Furthermore, several individual welding operations are required, any of which can result in improper welds having resultant high resistance that may result in operating difficulties with the battery.

Even further, such types of battery construction require substantial amounts of lead, which itself imposes an undesirable expense in the art of battery construction, particularly as regards cost of materials.

Furthermore, such types of battery constructions occupy valuable headspace that should exist to accommodate acid vapors and the like.

Even further, such headspace during battery operation will often contain substantial amounts of hydrogen gas, particularly if sulfuric acid is the acid used in the battery, and in the case of improper weldments offerring high resistance to electrical connections, and in the event of electrical "shorts" in such hydrogen atmosphere in the headspace, explosions can result during the operation of the battery.

One effort to eliminate some of the aforementioned problems has been to reduce the electrolyte level within the battery, thereby starving the battery for electrolyte, in order to allow sufficient headspace above the liquid electrolyte for gasing and condensation, as well as for expansion of the liquid electrolyte, all of these being considerations that should be taken into account with respect to accommodating the electrolyte. However, such does not solve all of the problems set forth above, particularly the problems caused by long electrical connections, and by multiplicities of such connections, some of which are not readily observable during manufacture for detection of improper weldments, nor is such a correction particularly advantageous insofar as operation of the battery is concerned, in that the battery by running starved, does not have sufficient electrolyte for operating at peak efficiency.

Another development in the art of battery manufacture has been to provide a connection between straps of adjacent cells that extends through the partition wall that separates such cells, rather than having the longer path up over the partition wall. This modification has facilitated the shortening of the electrically conductive path between adjacent cells, and has reduced the material expense involved in battery manufacture by requiring less lead, and has allowed the partition cells to remain at a height greater than that of the plates, but has introduced other problems such as the difficulty of facilitating a visual inspection for electrical continuity of the connection between opposite sides of the partition even before the cover is placed on the battery casing. Furthermore, this technique places a limitation upon the amount of electrolyte, or the height of electrolyte that may be provided in the cells below the connection. Even further, this technique involves a perforation of the partition wall between adjacent cells, and thereby presents an additional problem that must be overcome, of sealing the perforation about the welded connection, at a location that is difficult to reach with satisfactory sealants for preventing the transfer of electrolyte between adjacent cells.

Others of the problems set forth above have been reduced to some degree by various other developments in the art. However, the present technique of battery manufacture, and batteries made thereby is directed toward maximizing the headspace without sacrificing the amount of electrolyte in the battery, and while still obtaining a short electrical path between paths of the same cell and/or between plates of adjacent cells, by methods, techniques and structure novel in the art.

THE PRESENT INVENTION

The present invention provides a novel battery construction directed toward obviating many of the above-discussed problems.

Accordingly, with the battery construction of this invention, the electrical connections between plates of the same cell, and between plates of adjacent cells (with the exception in some instances of those plates in the same cells as the end terminal posts) are outside the environment of the electrolyte, outside the interior of the battery itself, and particularly are outside the headspace zone above the battery cells. Specifically, such connections are provided through the bottom of the battery, by extending lugs of battery cell plates down through openings in the battery bottom and welding or otherwise effecting electrically conductive connections between lugs thus extended, such weldments taking place outside the interior of the battery, and by sealing the openings against passage of electrolyte. Such sealing may be done from inside the battery, and from outside the battery, with the sealing outside the battery also protecting and insulating the weldments thus effected.

These connections are therefore sufficiently short to have reduced or minimal electrical resistence between plates thus connected, and would not be subject to the acid vapor environment of the headspace. Such short connections of necessity would reduce the amount of lead required in making such connections, and the location of the connections outside the interior of the battery would reduce the danger of explosion.

Another feature of this invention resides in the capability of inspecting the weldments visually, and electrically.

Still another feature of this invention resides in allowing the welding operations done at the bottom of the battery to be done simultaneously. Still further, the sealant between the perforations in the battery bottom may be readily applied at a location of the battery (inside and outside the battery bottom) such that ample sealant may be utilized to render the battery secure against leakage.

The battery in accordance with this invention lends itself to construction by concurrent machine welding operations whereby various weldments may simultaneously be effected.

Also, in accordance with some prior art techniques, it was possible for assembly workers to drop the plates into cells backwards. Another feature of this invention resides in the use of spacer members for disposition over lugs prior to their insertion through openings in the battery bottom, with the spacer members having openings that are predetermined in number for receiving a predetermined number of cell plate lugs, such that it would be apparent to an assembler if a given plate of a given cell were improperly positioned. Furthermore, the use of such spacer members facilitates assembly of the battery, in assuring that the lugs will be properly directed for disposition through the openings in the battery bottoms.

Another feature of this invention is that it lends itself toward the use of an acid-containing bag or receptacle in the headspace of the battery, that in turn simplifies activation of the battery. Moreover, a particular construction of such an acid-containing receptacle is provided, in order to enable filling of the battery with water therethrough and for facilitating introduction of acid from such receptacle into water already disposed within the battery cell, by simple and efficient means and techniques.

A further advantage of this invention is that it allows for flow of sediment and other particles into a zone at the center bottom portions of the battery beneath the plates, for preventing contamination of the electrolyte zone between the plates, and for preventing electrical "shorts" from occurring, in that the sealant itself is utilized to provide sloped surfaces directing sediment that may otherwise fall into corners between the battery sidewalls and bottom wall, into the sediment-containing zone discussed above.

Furthermore, this invention lends itself toward providing multiple seals against battery acid leakage through the bottom.

Even further, this invention lends itself toward novel efficient construction techniques. The present invention is directed toward providing a battery utilizing plates in one or more cells thereof, with connections of plates in a given cell, and in the case of multiple cell batteries, with connections of plates in adjacent cells taking place through the battery bottom, outside the interior of the battery, at least with respect to those connections not associated with the battery end terminals. A novel acid-containing receptacle is provided, as well as a technique for introducing acid contained therein into the liquid within the battery.

Accordingly, it is a primary object of this invention to provide a novel battery.

It is a further object of this invention to provide a novel method of making a battery.

It is another object of this invention to provide a novel battery-acid-containing receptacle.

It is a further object of this invention to provide a novel battery having increased headspace therein.

It is another object of this invention to accomplish the foregoing objects, wherein such headspace is adapted for containing an acid receptacle therein.

It is a further object of this invention for providing a battery having through-the-bottom electrical connections between plates thereof, outside the interior of the battery, with means for sealing such connections against battery acid leakage.

It is a further object of this invention to provide novel methods of battery manufacture that will facilitate ease of construction of the battery, and that lend themselves toward efficient welding and other operational techniques.

It is another object of this invention to provide a novel method of activating a battery by the use of an acid package contained within the headspace above the plates in a battery.

Other objects and advantages of the present invention will become readily apparent to those skilled in the art from a reading of the following brief descriptions of the drawing figures, detailed descriptions of the preferred embodiments, and the appended claims.

IN THE DRAWINGS

FIGS. 8a, 8b, 8c, 8d, 8e, 8f, 8g, 8h, and 8i are schematic sequential illustrations (some fragmentary), in transverse section, wherein the various stages of battery manufacture of this invention are sequentially illustrated, including the initial formation of the battery, as well as its activation with acid and water.

DESCRIPTION OF THE PREFERRED EMBODIMENTS

Figure 1:
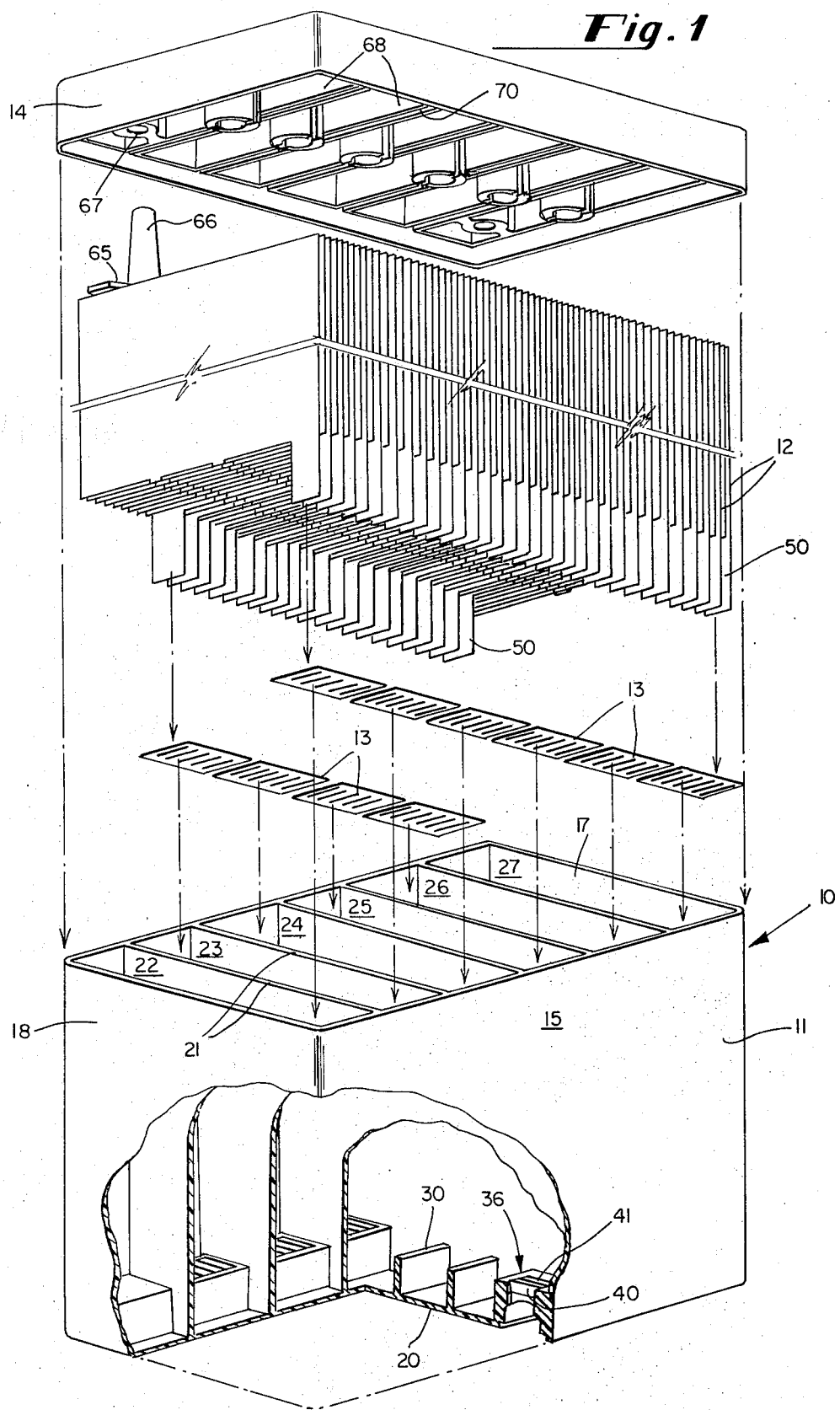
FIG. 1 is a perspective view of a battery of this invention, wherein various components are illustrated in a manner readily depicting the assembly thereof.

Referring now to the drawings in detail, reference is first made to FIG. 1, wherein the battery of this invention is generally designated by the numeral 10 as comprising a casing 11, battery cell plates 12, spacers 13, for plate lugs, and a battery cover 14.

Weldments, separators between adjacent plates, terminal posts, straps for terminal posts, etc. are also included as components of the battery. The term "battery" as used herein will be construed to encompass the structure itself, prior to introducing an electrolyte or liquid into the casing, and even prior to the introduction into the battery structure of a receptacle of the bag type such as is herein disclosed, for containing liquid acid prior to introducing such acid into the water of the battery cells. Thus, the term "battery" encompasses the hardware type structure. However, such a structure, when having an acid-containing receptacle in accordance with this invention disposed therein will be a "battery" ready for activation, and, when the battery acid from such a receptacle is permitted to enter water that is also contained within the battery, such will be a battery ready for operation.

With particular reference to FIGS. 1, 5, 6 and 7, the casing 11 will be described in detail. The casing 11 will generally be constructed to be a one-piece molded unit, of hard rubber, plastic or like material (including thermoplastic), having acid resistant and electrically nonconductive qualities. For example, the case material (and even the cover material if desired) may be of polypropylene construction if desired.

The casing 11 will have sidewalls 15, 16, end walls 17, 18, and a bottom 20.

Parallel to the end walls 17 and 18 are a plurality of partitions 21 that separate the various cells 22, 23, 24, 25, 26 and 27, one from the other. Thus, the partitions 21 extend between the walls 16 and 15, and completely seal adjacent cells off from each other.

The partitions 21 extend to a height substantially as that illustrated in FIG. 1, but in any event, will be of a height to prevent the flow of battery acid from one cell to another, thereover.

Figure 6:
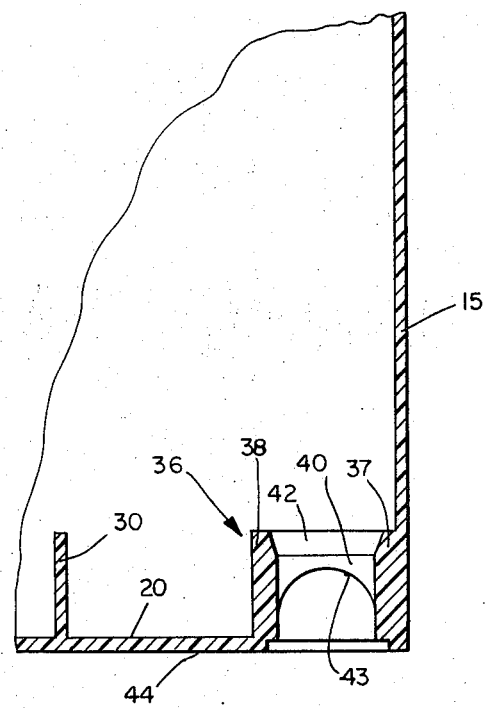
FIG. 6 is an enlarged fragmentary transverse sectional view, taken through the battery casing illustrated in FIG. 5, generally along the line VI—VI of FIG. 5, and with such illustration being of the casing in the upright disposition.

The bottom 20 of the battery is provided with upstanding protrusions of the plate type 30, as illustrated in FIG. 6, in order to space battery cell plates 12 upwardly above the bottom of the battery, in order to allow spaces beneath the plates 12 to accommodate sediment and the like, including impurities that may enter the battery during operation thereof. In any event, the members 30 will function as vertical spacers.

It will be noted that the battery casing as illustrated in FIG. 1 is to accommodate a six cell battery, and will therefore have five weldment-molding zones 31, 32, 33, 34 and 35. Thus, a protrusion such as that 36 illustrated in FIG. 1 will extend between adjacent partitions 21, or between partitions 21 and an end wall such as 17 or 18, and therefore substantially along the battery bottom, at its juncture with associated sidewalls such as 15 or 16. The protrusions 36 comprise thicker portions 37 of the sidewalls 35, and corresponding thicker portions 38 upstanding from the bottom 20, as illustrated in FIG. 6, connected by web portions 40, arranged one after the other, and spaced from each other defining openings or slots 41 therebetween. The upper ends of the webs 40 each define an apex 42, such that adjacent apices of adjacent webs 40 provide a chamfered inlet for openings 41 therebetween, for facilitating the introduction of downwardly extending lugs of plates 12 into the openings or slots 41. The lower ends of the webs 40 have an arcuate configuration 43 spaced upwardly from the lower surface 44 of the bottom 20, as illustrated in FIG. 6.

Figure 7:
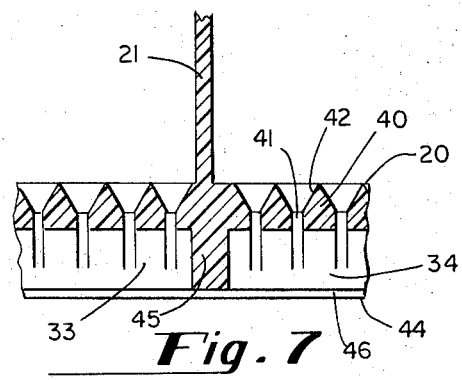
FIG. 7 is an enlarged fragmentary longitudinal sectional view taken through the battery casing of FIG. 5, generally along the line VII—VII of FIG. 5, and wherein the openings along the sides of the battery bottom for disposition of plate lugs therethrough are clearly illustrated.

With particular reference to FIG. 7, adjacent weldment zones 33, 34 are separated from each other by spacer portions 45, in order that molten metal from the melted lugs of the plates 12, or molten metal added thereto, for welding together lugs protruding through slots 41 of one of the weldment zones 33 will not pass into an adjacent one of the weldment zones 34 or the like.

It will also be noted that the lower end of the separator portion 45 does not extend completely to the surface 44 of the battery bottom 20, but is spaced therefrom by an amount 46, the purpose of which will be described more fully hereinafter, but basically which is to accommodate the application of an outer sealant thereover, traversing all weldment zones such as 33, 34 and 35 along one side of the battery. The same arrangement is provided for weldment zones 31 and 32 on the opposite side of the battery.

The spacers 13 are provided, for disposition over downwardly protruding lugs of battery plates 12, for facilitating the introduction of battery plates 12, into cells such as 22 through 27, and also to maintain the lowermost ends of such lugs appropriately spaced from each other, in order to facilitate their reception within slots or openings 41 of the battery bottom 20.

The battery plates 12 are provided with downwardly protruding lugs 50 that are inserted into slots in the spacers 13, and that also are inserted into the openings 41, in groups, one group for each of the cells 22 through 27. It will be noted that all of the groups may be inserted at once into the battery, if desired. It will further be noted that the battery plates 12 are provided with downwardly protruding feet 51 for seating upon spacers 30, as illustrated most clearly in FIG. 3.

Figure 2:
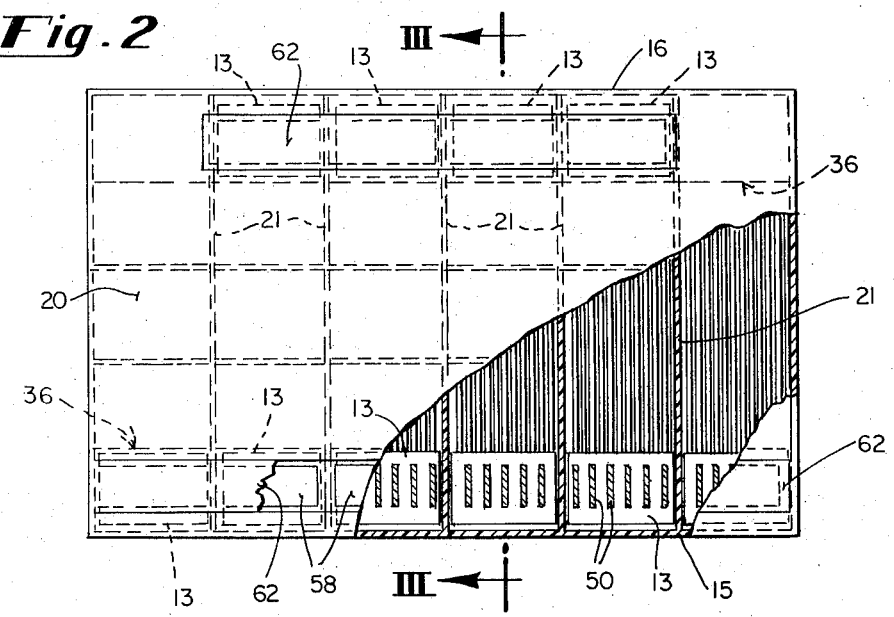
FIG. 2 is a bottom view of a battery, in accordance with this invention, with portions broken away for the sake of clarity, to illustrate internal portions thereof.
Figure 3:
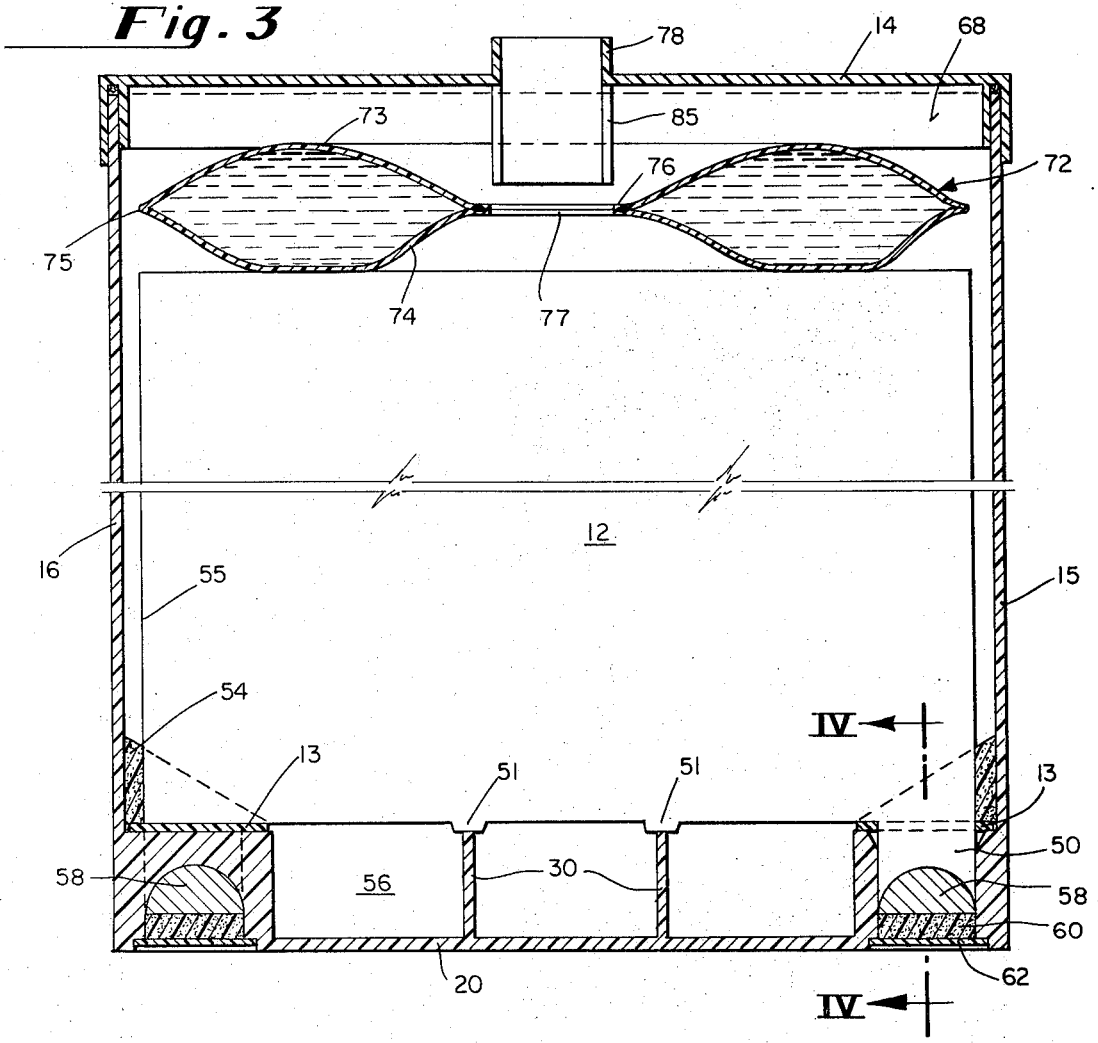
FIG. 3 is an enlarged transverse cross-sectional view, of the battery of FIG. 2, taken generally along the line III—III of FIG. 2, but with the battery in upright disposition, and wherein an acid-containing package, as well as weldments and seals for the various battery plates are clearly illustrated.
Figure 5:
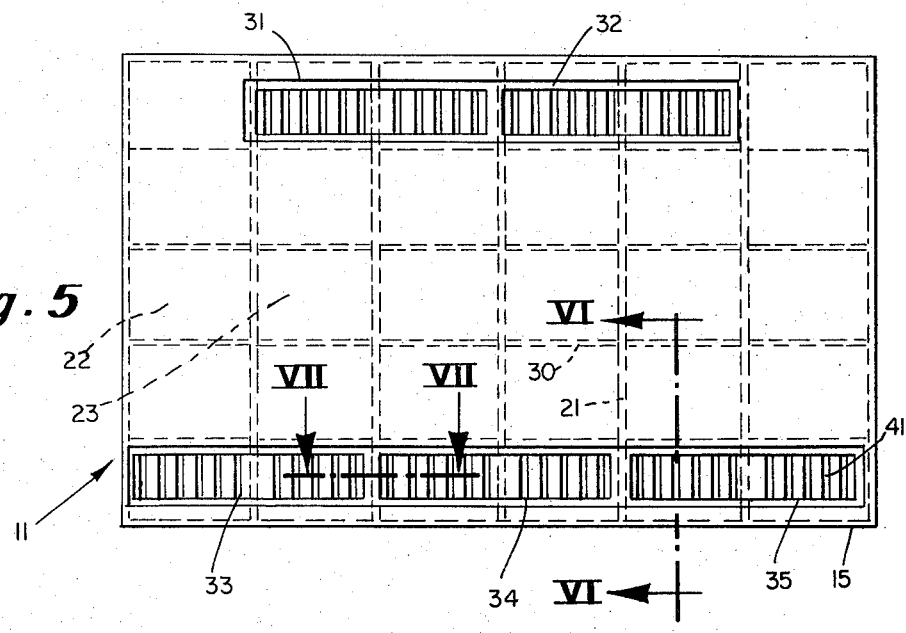
FIG. 5 is a bottom plan view of the battery casing in accordance with this invention, prior to assembly of battery plates, separators and the like thereinto.
Figure 4:
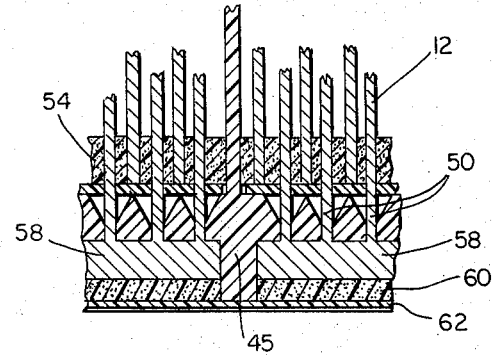
FIG. 4 is an enlarged fragmentary longitudinal sectional view, through a battery plate lug weldment and seal in accordance with this invention, taken generally along the line IV—IV of FIG. 3.

With reference in particular to FIGS. 2, 3 and 4, the construction of the battery will be more fully described. With the battery plates 12 seated within appropriate cells as described above, and as illustrated in FIG. 8a, the battery casing 11 may then be tilted first to one side for introduction of a resin, plastic or the like, through a suitable nozzle such as 53, the sealant such as an epoxy, resin or the like being allowed to run down the inner surface of the sidewall 16, and to form a triangular configuration such as that 54 filling the space between adjacent plates 12 at their lower associated corner with the bottom, above the spacer 13, and sealing the openings or slots through which the lugs 50 pass relative to the spacers 13, and also sealing completely about the spacers 13, and sealing the spacer 13 to the inner sidewall 16, as well as filling the space between an edge such as that 55 of a given plate 12 and the inner surface of the sidewall 16. Thus, at this point, the quick-hardening sealant applied effectively seals that one side of the lower interior end of the battery.

Figure 8A:
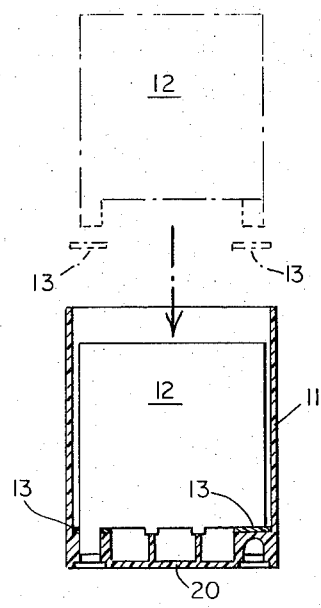
Figures 8B, 8C:
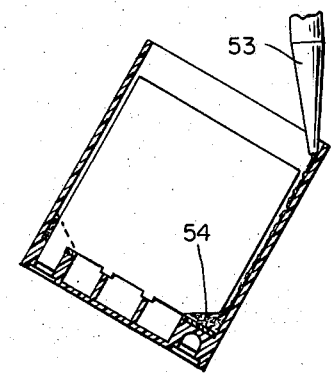

Then, the battery casing 11 is tilted approximately 30° to 45° off of a vertical line to the right, as illustrated in FIG. 8c, and an epoxy, resin or the like is similarly applied to the right side, similarly effecting a like sealing operation, as is illustrated at the right-most end of FIG. 3 and in sequential illustration 8c.

It will be noted that the triangular arrangement thus illustrated and accomplished by tilting the casing in the different directions illustrated in FIGS. 8b and 8c, and the arrangement thus obtained as is more clearly illustrated in FIG. 3, facilitates a ramp, slope or the like for sediment to be guided toward the center of the battery bottom 20, into recesses such as that 56 illustrated in FIG. 3.

Figure 8D:
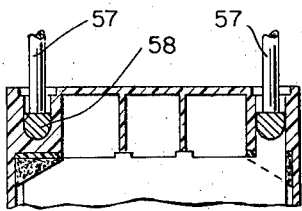

The battery casing 11 is then inverted as illustrated in FIG. 8d, and the lug portions protruding into the various zones 33, 34, 35, and zones 31 and 32 on the opposite side of the battery are then welded, either by an open flame type welding or burning, or by a thermal relay type welding, in which hot elements 57 are brought into contact with the lugs. In any event, it will be understood that it will not ordinarily be necessary to add additional weld metal other than that provided by the protrusions or lugs of the plates themselves, but that, if desired, such may be added. Furthermore, the welding operations may be effected simultaneously, or seriatim, but that the technique of battery manufacture disclosed herein lends itself toward simultaneous welding.

Weldments 58 are thus effected. Each such weldment 58 electrically connects lugs 50 of plates 12 within the same cell to each other, and lugs of two adjacent cells to each other, inasmuch as the zone for example, 33 facilitates the connections of lugs along the side 15 of the battery, of cells 22 and 23 together. Similarly, lugs of other adjacent cells are likewise connected together as will be clear from the drawings.

Figure 8E:
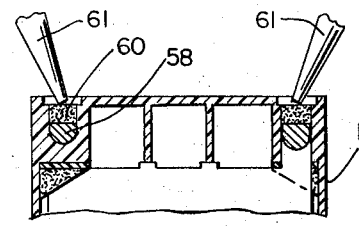
Figure 8F:
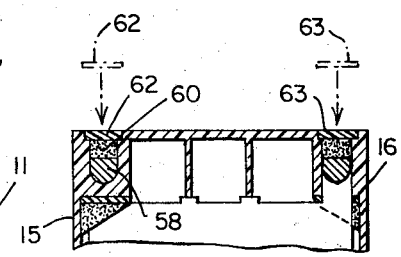

It will further be apparent that the arcuate configurations 43 and inner walls of thickened portions 37 and 38 as illustrated in FIG. 6 form molds for associated said weldments 58. Moreover, each of the weldments 58 does not extend to a height (when the casing is inverted as illustrated in FIGS. 8d, 8e, and 8f) sufficient to fill an associated said zone 33, 34, etc. This is to allow a resin, epoxy or the like to be introduced over the weldment 58, to form a seal 60, as illustrated in FIG. 8e, by applying an epoxy, resin or other suitable thermoplastic or other seal, preferably in liquid form thereover by application through a nozzle such as 61 or the like. It will be noted that all of the sealant operations over the weldments 58 of the type illustrated in FIG. 8e may be applied simultaneously, or seriatim, as desired, but that the simultaneous application of the sealant 60 is preferred.

In FIG. 8f, a next step of applying a third sealant 62, over the sealant 60, is illustrated, the sealant 62 being a thermoplastic strip, if desired that not only covers the sealant 60, but that traverses all of the zones on one side of the battery bottom, such as the zones 33, 34 and 35, also passing over separator portions 45. A like sealing member 63, of shorter length is applied over the zones 31 and 32.

Each of the sealing members 62 and 63 may be a strip of thermoplastic, epoxy, resin, or any other suitable construction, if desired, or such may even be applied in liquid form, although a strip is illustrated in FIG. 8f. In instances when a strip is desired, such may usually be applied prior to complete setting or hardening of the sealant 60, in order to assure adherence thereto, but it will be noted that if strips 62 and 63 are utilized for the third sealant, such may be heated prior to or subsequent to their application as illustrated in 8f, for assuring their adherence to the bottom 20 of the casing 11, and to the sealant 60.

Figure 8G:
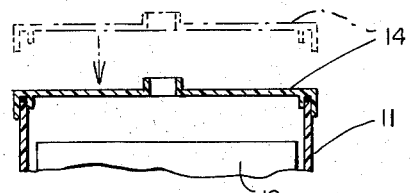

The cover 14 may then be applied to the casing 11, after returning the casing 11 to an erect or upright position, although the cover 14 could, if desired, be applied while the casing 11 is in the inverted positions illustrated in FIGS. 8d, 8e, or 8f. However, it will be noted that, if desired, prior to the application of the cover 14 to the casing 11 as illustrated in FIG. 8g, it may be desired to introduce packages containing battery acid into the various cells of the battery.

It should be noted at this point, that by applying the inner sealant applied in FIGS. 8b and 8c, such hardens almost immediately, and allows the casing 11 to be inverted without the plates 12 falling therefrom. Furthermore, it will be noted that with the sealant applied in FIGS. 8b and 8c, and in FIG. 8e, and the additional sealing strip applied in FIG. 8f, such comprises a triple seal for the battery bottom for assuring against leakage of battery acid therethrough.

It will further be noted that the battery of this invention contemplates having top terminals or terminal posts, such that lugs of some of the battery plates in end cells will face in an upward direction and have a conventional battery strap 65 welded thereacross, as illustrated in FIG. 1, to which a metal post 66 is welded by conventional techniques, with the post 66 protruding upwardly through a suitable void 67 therefor, at each end of the battery cover 14, in a conventional manner, for connection of battery cables to the terminal posts 65.

It will also be noted that the battery cover 14 is provided with cell-dividing panels 68 that have their lower ends having interior grooves 70 therein for accommodating and receiving therein the upper edges of battery cell separating panels 21, also for assuring against passage of battery cell fluid between adjacent cells, during operation thereof, as for example, if an automobile undergoes a "rocking" motion or the like.

In FIG. 3 there is illustrated a receptacle generally designated by the numeral 72, that comprises upper and lower inert thermoplastic layers 73, and 74, generally of rectangular configuration in plan, but not specifically illustrated in FIG. 3, for fitting into the rectangularly configured cells of the battery, above plates 12 therein, and for resting on the upper edges of plates 12, as illustrated in FIG. 3. Outer peripheral edges 75 of the bag 72 are joined as illustrated in FIG. 3. It will be noted herein that "joined" may either define an initial juncture by virtue of integral manufacture, or may encompass a heat sealing or welding operation that will effectively connect the same together. At the interior of the bag 72, there is also a "washer" type annular juncture, heat seal or the like 76, defining a generally circular void 77, centrally located, or at least preferably located directly beneath a battery cell fill opening 78 in the cover 14 thereof.

Thus, preferably, one bag 72 is provided in each cell, with a central opening 77 therein disposed beneath the fill opening 78 of each cell. The bag 72 contains a suitable battery acid, such as sulfuric acid or the like.

Figure 8H:
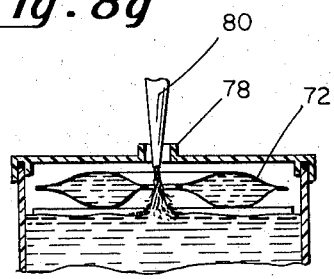
Figure 8I:
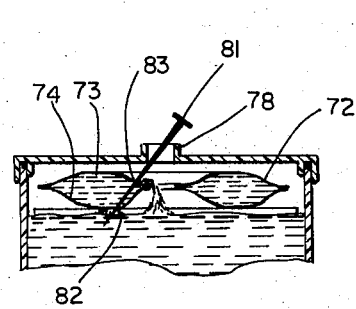

With reference to FIGS. 8h and 8i, the manner of activating a battery will be more clearly understood. A suitable amount of water will be introduced into each of the battery cells, by a nozzle 80 or the like, as illustrated in FIG. 8h, filling each cell to a predetermined level. It will be noted that the generally circular opening 77 in the bag 72 will permit introduction of the water through the bag 72, and the bag 72 will therefore not interfere with the filling of the cells with water to the predetermined water level.

With reference to FIG. 8i in particular, it will be noted that a pin 81 is then inserted through the cell cover opening 78, with the pin 81 being "cocked" to one side or biased to one side as illustrated in FIG. 8i, to puncture through the bag 72, through both upper and lower layers 73 and 74 thereof, respectively, such that, upon removal of the pin 81, the battery acid contained within the bag 72 may flow outwardly therefrom, into the cell therebeneath, to mix with the water contained within such cell, through the opening 82 thus formed in the lower surface 74 of the bag 72, and with the opening 83 thus formed in the upper surface 73 of the bag 72 by the pin 81, a vent is provided for facilitating the discharge of substantially all, or all of the acid from the bag 72, into the water therebelow. After removal of the pin 81, a cap (not shown) may be provided for each opening 78, and the battery may then be charged in a desired manner, for a desired time period, whereby the battery will be ready for use.

It will also be noted that, if desired, at the time of applying the cover 14 to the casing 11, an adhesive may be applied to the upper edges of the partition plates 21, for facilitating their adherence within the groove 70 of the panels 68 of the cover 14. However, such may not be necessary in that a mechanical fit may be sufficient.

It will be noted that the sealants used are all electrically non-conductive in order that there not be provided an undesired path of current flow.

It will further be noted that any structure may be utilized for providing the piercing effected by the needle or pin 81, and that the inlet 78 may have a configuration designed to accommodate such introduction of a needle or pin, as for example having vertical slots such as 85 in the depending annular portions of the inlets 78, all such modifications being with this invention. Furthermore, the slope for the seal along the inner sides of the battery casing, may vary, depending upon the amount of "tilt" of the casing 11 that is utilized during application of the inner sealant 54, as for example during introduction as illustrated in FIGS. 8b and 8c. Moreover, while such "tilting" is the preferred manner of introducing such a sealant, such is not to be construed as limiting, in that suitable nozzles may be utilized that do not require such "tilting".

It will further be noted that while particular embodiments of battery components and of batteries themselves are illustrated, as well as techniques for filling and activating the same, and as well as preferred methods of making batteries and activating the same are taught herein, it will be clear that various modifications may be made in all of these within the spirit and scope of the invention as defined in the appended claims.

It will be noted that battery plate separators (not shown) will be utilized between adjacent plates 12, introduced into battery casings usually simultaneously with the plates 12. However, in the interest of clarity, specific illustration thereof is omitted.

What is claimed is:

1. A battery comprising a casing and a cover and having a plurality of battery plates therein, the casing having generally upstanding sidewalls and a bottom, said sidewalls and bottom cooperating to define the battery interior, with means connecting the plates in electrically conductive connection through the battery bottom, outside the battery interior, wherein said connecting means comprises weldment means, wherein openings are provided in said battery bottom for receipt of portions of battery plates therethrough, and wherein means are provided sealing said battery bottom openings against leakage, and wherein said battery plate portions comprise downwardly protruding lugs prior to the welding thereof, and wherein said openings are along battery sidewalls, and wherein said sealing means comprises an electrically nonconductive sealant applied over said openings and immediately adjacent plate portions at an interior juncture of said battery bottom and adjacent sidewall portions, said sealant having a sloped upper surface that slopes from a higher location along the casing sidewall portion to a lower location at said bottom inward of said sidewall portion.

2. The battery of claim 1, wherein the battery is of the multiple cell type having partition plates extending across the casing separating adjacent cells, and with a plurality of plates in each cell and with said connecting means being disposed for connecting plates of adjacent cells and plates of the same cell, wherein said connecting means comprises weldments and wherein the same weldment that connects plates of the same cell also connects plates of adjacent cells, wherein each said weldment substantially spans two said cells along one side of the battery bottom.

3. The battery of claim 1, wherein lower end portions of the battery plates are disposed spaced above a generally central bottom portion defining a sediment collection station, and with said sloped upper surfaces comprising means for deflecting sediment from plate portions disposed above said sealant into said sediment collection station.

4. A battery comprising a casing and a cover and having a plurality of battery plates therein, the casing having generally upstanding sidewalls and a bottom, said sidewalls and bottom cooperating to define the battery interior, with means connecting the plates in electrically conductive connection through the battery bottom, outside the battery interior, wherein the battery is of the multiple cell type having partition plates extending across the casing separating adjacent cells, and with a plurality of plates in each cell and with said connecting means being disposed for connecting plates of adjacent cells and plates of the same cell, wherein said connecting means comprises weldments and wherein the same weldment that connects plates of the same cell also connects plates of adjacent cells, wherein openings are provided in said battery bottom for receipt of portions of battery plates therethrough, and wherein means are provided sealing said battery bottom openings against leakage, wherein said openings comprise slotted holes, and wherein said battery plate portions received therethrough comprise downwardly protruding lug portions prior to the welding thereof, and with groove means located in said battery bottom outside the interior of the battery and above a lowermost outer surface of battery, and groove means comprising a mold for a said weldment during the welding operation.

5. The battery of claim 4, wherein said sealing means comprises an electrically non-conductive sealant disposed in said groove means immediately below and against a said weldment in sealing relation therewith.

6. The battery of claim 5, wherein said sealing means includes an additional sealant layer disposed immediately below and against said non-conductive sealant.

7. The battery of claim 1, wherein said openings are chamfered at the interior of the battery and comprise means facilitating the guiding of said battery plate portions thereinto.

8. A battery comprising a casing and a cover and having a plurality of battery plates therein, the casing having generally upstanding sidewalls and a bottom, said sidewalls and bottom cooperating to define the battery interior, with means connecting the plates in electrically conductive connection through the battery bottom, outside the battery interior, said battery including headspace inside the battery between upper ends of the battery plates and the cover, with at least one closed receptacle of liquid impermeable material containing battery acid therein, disposed within said headspace.

9. The battery of claim 3, wherein the battery is of the multiple cell type having partition plates extending across the casing separating adjacent cells, with a plurality of plates being in each cell and with said connecting means being disposed for connecting plates of adjacent cells and plates of the same cell, and wherein a closed bag of liquid impermeable material containing battery acid is disposed within the headspace above each said cell.

10. The battery of claim 9, wherein the cover is provided with one cover opening therethrough into each said cell headspace, and with a bag associated with each said opening being disposed therebeneath, with each bag comprising an upper and lower wall joined together in a generally annular liquid-tight juncture below an associated said cover opening, with a hole through said upper and lower bag walls inside said generally annular juncture for facilitating the filling of the associated cell with water through said cover opening and said annular juncture.

11. A battery comprising a casing and a cover and having a plurality of battery plates therein, the casing having generally upstanding sidewalls and a bottom, said sidewalls and bottom cooperating to define the battery interior, with means connecting the plates in electrically conductive connection through the battery bottom, outside the interior, with plates of opposite ends of the battery being connected to battery terminal posts that protrude through the cover, said casing, cover, and plates being configured to define headspace between tops of battery plates and the cover, said headspace being free of any connection between plates except connections in which plates are connected to terminal posts.

* * * * *